(12) United States Patent
Liu et al.

(10) Patent No.: US 12,468,193 B2
(45) Date of Patent: Nov. 11, 2025

(54) OPTICAL COMPONENT, BACKLIGHT MODULE AND DISPLAY APPARATUS

(71) Applicant: SHENZHEN SKYWORTH-RGB ELECTRONIC CO., LTD., Shenzhen (CN)

(72) Inventors: Xin Liu, Shenzhen (CN); Wencong Zou, Shenzhen (CN); Jiunpyng You, Shenzhen (CN); Sheng Li, Shenzhen (CN); Weixiong Chen, Shenzhen (CN); Yarong Hou, Shenzhen (CN); Wensheng Hong, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/612,161

(22) Filed: Mar. 21, 2024

(65) Prior Publication Data

US 2024/0231150 A1    Jul. 11, 2024

Related U.S. Application Data

(63) Continuation of application No. PCT/CN2021/140893, filed on Dec. 23, 2021.

(30) Foreign Application Priority Data

Oct. 29, 2021  (CN) .......................... 202111275436.8

(51) Int. Cl.
G02F 1/1335    (2006.01)
(52) U.S. Cl.
CPC .............................. G02F 1/133607 (2021.01)

(58) Field of Classification Search
CPC ......... G02F 1/133606; G02F 1/133603; G02F 1/133607
See application file for complete search history.

(56) References Cited

U.S. PATENT DOCUMENTS

2010/0031544 A1*  2/2010  Hwang ............... G09F 13/0409
                                                40/564
2011/0149198 A1*  6/2011  Kim .................. G02F 1/133308
                                                349/161

(Continued)

FOREIGN PATENT DOCUMENTS

CN      101598291 A      12/2009
CN      103322504 A       9/2013

(Continued)

OTHER PUBLICATIONS

First Office Action issued in counterpart Chinese Patent Application No. 202111275436.8, dated May 30, 2022.

(Continued)

*Primary Examiner* — Eric T Eide
(74) *Attorney, Agent, or Firm* — Westbridge IP LLC (57) ABSTRACT

Disclosed are an optical component, a backlight module and a display apparatus. The optical component includes: a lens body, a light distribution film and a light source; a light-emitting surface is provided at a top of the lens body, and an accommodating groove is provided at a bottom of the lens body; the light distribution film is provided on the light-emitting surface, at least one bubble layer is formed in the light distribution film, and the bubble layer is provided with a bubble structure; the light source is provided in the accommodating groove, and a luminous surface of the light source is configured to face towards a wall of the accommodating groove.

15 Claims, 5 Drawing Sheets

(56) References Cited

U.S. PATENT DOCUMENTS

| | | | |
|---|---|---|---|
| 2012/0086871 A1* | 4/2012 | Yokota | G02F 1/133605 |
| | | | 348/739 |
| 2015/0036347 A1 | 2/2015 | Hu et al. | |
| 2016/0053965 A1* | 2/2016 | Oh | H10H 20/856 |
| | | | 362/335 |
| 2020/0363039 A1 | 11/2020 | Chu et al. | |

FOREIGN PATENT DOCUMENTS

| | | |
|---|---|---|
| CN | 103883976 A | 6/2014 |
| CN | 104110591 A | 10/2014 |
| CN | 206248964 U | 6/2017 |
| CN | 110764168 A | 2/2020 |
| CN | 111552115 A | 8/2020 |
| CN | 213988069 U | 8/2021 |
| CN | 213988070 U | 8/2021 |
| TW | 201400869 A | 1/2014 |

OTHER PUBLICATIONS

International Search Report and Written Opinion issued in corresponding PCT Application No. PCT/CN2021/140893, dated Jul. 27, 2022.
Notification to Grant Patent Right for Invention issued in counterpart Chinese Patent Application No. 202111275436.8, dated May 24, 2023.
Second Office Action issued in counterpart Chinese Patent Application No. 202111275436.8, dated Jan. 30, 2023.
European Search Report issued in counterpart European Patent Application No. EP 21962264.4, dated Aug. 6, 2025.

* cited by examiner

OPTICAL COMPONENT, BACKLIGHT MODULE AND DISPLAY APPARATUS

CROSS-REFERENCE TO RELATED APPLICATIONS

The present application is a continuation application of International Application No. PCT/CN2021/140893, filed on Dec. 23, 2021, which claims priority to Chinese Patent application Ser. No. 202111275436.8, filed on Oct. 29, 2021. The disclosures of the above-mentioned applications are incorporated herein by reference in their entireties.

TECHNICAL FIELD

The present application relates to the technical field of liquid crystal display, and in particular to an optical component, a backlight module and a display apparatus.

BACKGROUND

The luminous angle of the light source in the backlight module is usually about 120°, and the optical energy of which is mainly concentrated on the front. It is necessary to use an optical lens for secondary light distribution, so as to obtain the evenly distributed optical energy with the ultra-wide-angle. The traditional optical lens mainly uses the curvature changes of the inner and outer surfaces to control the light path, and the control of the light path is limited and cannot fully disperse the dense optical energy emitted by the light source. The optical energy emitted by the light source is still strong and concentrated in the front, and is weak and dispersed on the side, which is easy to cause problems such as light spot on the lamp or light and dark aperture, the filament between lamp strips and the dark frame and dark corner of the module after being projected onto the diffuser plate.

SUMMARY

Embodiments of the present disclosure provide an optical component for alleviating the situation where the optical energy emitted by the light source is still strong and concentrated on the front and weak and dispersed on the side, and for alleviating problems such as light spot on the lamp or light and dark aperture, the filament between lamp strips and the dark frame and dark corner of the module after being projected onto the diffuser plate.

In order to achieve the above purpose, the present application provides an optical component, including: a lens body, a light distribution film and a light source;
    a light-emitting surface is provided at a top of the lens body, and an accommodating groove is provided at a bottom of the lens body;
    the light distribution film is provided on the light-emitting surface, at least one bubble layer is formed in the light distribution film, and the bubble layer is provided with a bubble structure; and
    the light source is provided in the accommodating groove, and a luminous surface of the light source is configured to face towards a wall of the accommodating groove.

The present application also provides a backlight module, including: a back plate and the optical component;
    the back plate is provided with an installation groove; and the optical component is provided in the installation groove.

The present application also provides a display apparatus, including the backlight module.

The present application also provides an optical component, including: a lens body, a light distribution film, and a light source;
    a light-emitting surface is provided at a top of the lens body, and an accommodating groove is provided at a bottom of the lens body;
    the light distribution film is provided on the light-emitting surface, at least one bubble layer is formed in the light distribution film, and the bubble layer is provided with a bubble structure; and
    the light source is provided in the accommodating groove, a luminous surface of the light source is configured to face towards a wall of the accommodating groove;
    a thickness of the light distribution film is configured to gradually decrease in a direction from a center of the light distribution film to an edge of the light distribution film, and the light-emitting surface of the light distribution film is a light-emitting curved surface.

In the optical component of the present application, the light distribution film is provided on the light-emitting surface of the lens body, and at least one bubble layer is formed in the light distribution film. The bubble layer has a bubble structure. After the optical energy emitted by the light source reaches the light-emitting surface of the lens body, part of the optical energy will enter the light distribution film, which avoids the bubble structure and passes through the light distribution film to form the effective light emission at the top of the lens body. Part of the optical energy entering the light distribution film can be reflected and refracted on the critical surface of the bubble structure and the light distribution film, so that this part of the optical energy is reflected and refracted to the lens body. After multiple refractions inside the lens body, it is emitted from the surrounding sides of the lens body to form the effective light emission from the surrounding sides of the lens body. In this way, the strong and concentrated forward optical energy of the light source can be controlled in a targeted and precise manner, and part of the optical energy returns to the lens body, so as to strengthen the optical energy of the surrounding sides of the lens body, and mitigate the fact that the optical energy emitted by the light source is still strong and concentrated on the front and weak and dispersed on the sides, thereby alleviating problems such as light spot on the lamp or light and dark aperture, the filament between lamp strips and the dark frame and dark corner of the module after being projected onto the diffuser plate.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In addition, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. In the description of the present application, "plurality of" means at least two, such as two, three, etc., unless otherwise expressly specified.

The present application provides an optical component 100, aiming to alleviate the situation where the optical energy emitted by the light source 30 is still strong and concentrated on the front, and weak and dispersed on the side, so as to alleviate problems such as light spot on the lamp or light and dark aperture, the filament between lamp strips and the dark frame and dark corner of the module after being projected onto the diffuser plate.

Figure 1:
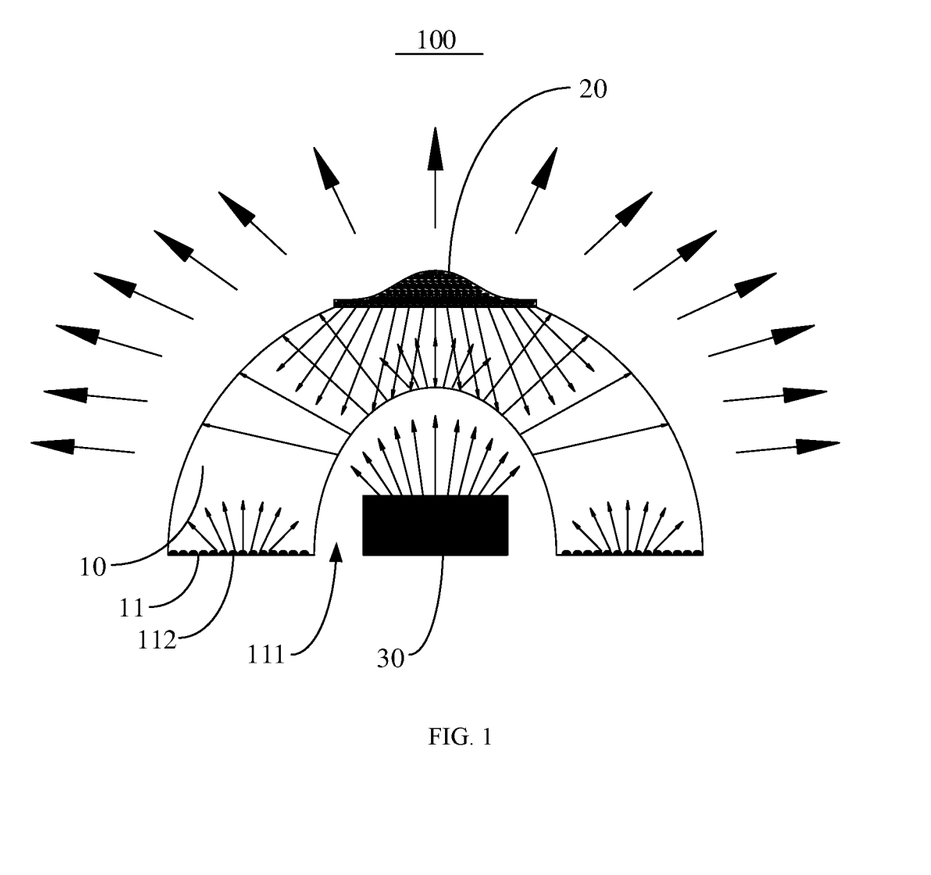
FIG. 1 is a schematic structural view of an optical component according to an embodiment of the present application.

The specific structure of the optical component 100 of the present application will be described below, taking the level of the optical component 100 as an example:

Referring to FIG. 1, in an embodiment of the optical component 100 of the present application, the optical component 100 includes a lens body 10, a light distribution film 20 and a light source 30. A light-emitting surface 12 is provided at a top of the lens body 10, and an accommodating groove 111 is provided at a bottom of the lens body 10. The light distribution film 20 is attached to the light-emitting surface 12, at least one bubble layer is formed in the light distribution film 20, and the bubble layer is provided with a bubble structure 21. The light source 30 is provided in the accommodating groove 111, and a luminous surface of the light source 30 is towards a wall of the accommodating groove 111.

It can be understood that in the optical component 100 of the present application, the light distribution film 20 is provided on the light-emitting surface 12 of the lens body 10, and at least one bubble layer is formed in the light distribution film 20. The bubble layer is provided with a bubble structure 21. After the optical energy emitted by the light source 30 reaches the light-emitting surface 12 of the lens body 10, part of the optical energy will enter the light distribution film 20, which avoids the bubble structure 21 and passes through the light distribution film 20 to form the effective light emission at the top of the lens body 10. Part of the optical energy entering the light distribution film 20 can be reflected and refracted on the critical surface of the bubble structure 21 and the light distribution film 20, so that this part of the optical energy is reflected and refracted to the lens body 10. After multiple refractions inside the lens body 10, it is emitted from the surrounding sides of the lens body 10 to form the effective light emission from the surrounding sides of the lens body 10. In this way, the strong and concentrated forward optical energy of the light source 30 can be controlled in a targeted and precise manner, and part of the optical energy returns to the lens body 10, so as to strengthen the optical energy of the surrounding sides of the lens body 10, and mitigate the fact that the optical energy emitted by the light source 30 is still strong and concentrated on the front and weak and dispersed on the side, thereby alleviating problems such as the light spot on the lamp or light and dark aperture, the filament between lamp strips and the dark frame and dark corner of the module after being projected onto the diffuser plate 300.

In addition, when using the traditional optical component 100, the optical energy emitted by the optical component 100 is uneven, which may cause subjective visual effect problems such as light spot on the lamp or light and dark aperture, the filament between lamp strips and the dark frame and dark corner. It requires a thicker diffuser plate 300 and more diaphragms for concealment, which leads to a significant increase in manufacturing costs and makes it difficult to achieve the ultra-thin design and ultra-low cost of the display apparatus. However, the present application changes the structure of the optical component 100 to alleviate the problems such as the light spot on the lamp or light and dark aperture, the filament between lamp strips and the dark frame and dark corner of the module after being projected onto the diffuser plate 300, which can effectively optimize optical parameters to effectively improve the image quality of direct display apparatus, facilitate the ultra-thin design and the cost-reduction design, and promote the industry progress.

It should be noted that the light distribution film 20 can be formed with a bubble layer having the bubble structure 21 through a biaxial stretching process. After entering the light distribution film 20, the optical energy can be reflected and refracted on a critical surface between the bubble structure 21 and the light distribution film 20. The refracted optical energy will reach the next medium interface, that is, a critical surface between the bubble structure 21 and the light distribution film 20. After repeated reflection and refraction, the optical energy can be fully reinforced to the sides of the lens body 10, so as to alleviate the situation where the optical energy emitted by the light source 30 is still strong and concentrated on the front, and weak and dispersed on the side.

Furthermore, the bottom of the lens body 10 and the wall of the accommodating groove 111 may constitute the light-incident surface 11 of the lens body 10.

Specifically, the material of the lens body 10 maybe at least one of the polymethyl methacrylate (PMMA), and the polystyrene (PS). The material of the light distribution film 20 can be the polyethylene terephthalate (PET), and the whole is transparent to ensure the light transmittance of the light distribution film 20.

Moreover, the wall of the accommodating groove 111 is an arc wall, and the arc wall of the accommodating groove 111 is smooth. In this way, when the optical energy emitted from the light source 30 passes through the wall of the accommodating groove 111 and is injected into the lens body 10, the loss of the optical energy can be reduced.

Figure 3:
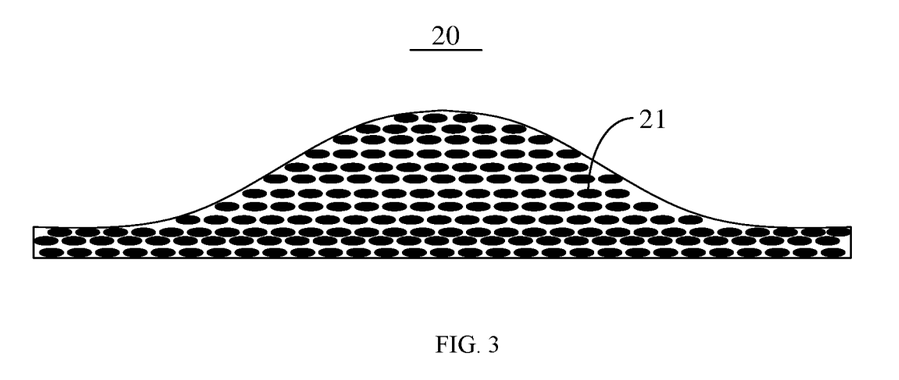
FIG. 3 is a schematic structural view of a light distribution film in the optical component according to an embodiment of the present application.
Figure 4:
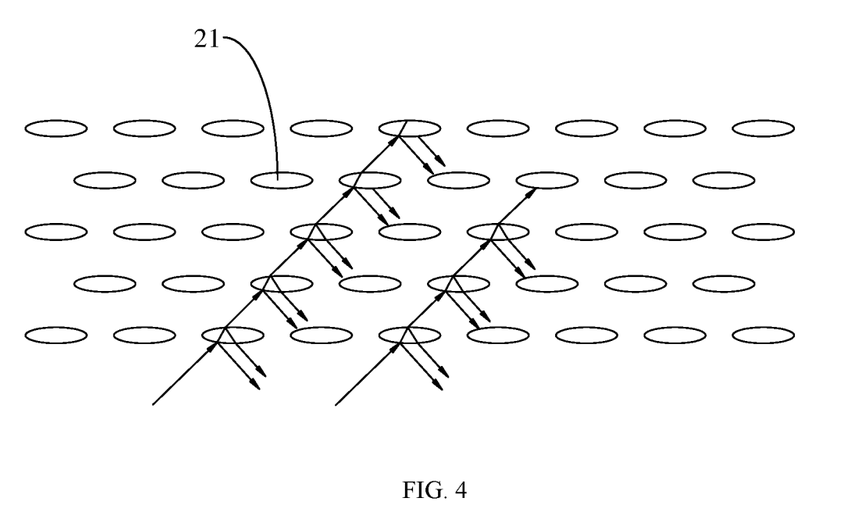
FIG. 4 is a schematic view of an optical energy passing through a light distribution film in the optical component according to an embodiment of the present application.

Further, with reference to FIG. 3 and FIG. 4, in an embodiment of the optical component 100 of the present application, each bubble layer is provided with a plurality of the bubble structures 21, and two adjacent bubble structures 21 are at intervals.

In this way, each bubble layer is provided with the plurality of bubble structures 21, that is, the plurality of bubble structures 21 are formed inside the light distribution film 20. After entering the light distribution film 20, the optical energy can be reflected and refracted for multiple times by the critical surface of the bubble structure 21 and the light distribution film 20 in sequence, thereby improving the reflection rate and the refraction rate of the optical energy, further fully reinforcing the optical energy to the surrounding sides of the lens body 10, so as to alleviate the situation where the optical energy emitted by the light source 30 is still strong and concentrated on the front, and weak and dispersed on the side, so that the light can be emitted uniformly from all positions of the light-emitting surface 12 of the lens body 10.

Of course, in other embodiments, two adjacent bubble structures 21 are seamlessly connected, or the two adjacent bubble structures 21 may also be partially overlapped.

Further, with reference to FIG. 3 and FIG. 4, in an embodiment of the optical component 100 of the present application, the plurality of the bubble structures 21 in each bubble layer is distributed in an array.

In this way, after entering the light distribution film 20, the optical energy can be reflected and refracted for multiple times by the critical surface of the plurality of bubble structures 21 in the array and the light distribution film 20 in each bubble layer, thereby further increasing the reflection rate and the refraction rate of the optical energy to further increase the number of the reflection and the refraction of the optical energy, thereby fully reinforcing the optical energy on the sides of the lens body 10, so that the optical energy can form a relatively uniform spatial distribution after a secondary light distribution by the lens body 10 and the light distribution film 20, which avoids the regional distribution of local over-brightness and local over-darkness.

Further, with reference to FIG. 3 and FIG. 4, in an embodiment of the optical component 100 of the present application, two adjacent bubble layers are spaced apart in a direction along the bottom of the lens body 10 to the top of the lens body 10.

In this way, after entering the light distribution film 20, the optical energy can be reflected and refracted for multiple times by the critical surface of the plurality of bubble structures 21 spaced apart in the direction along the bottom of the lens body 10 to the top of the lens body 10 and the light distribution film 20 in each bubble layer, thereby further increasing the reflection rate and the refraction rate of the optical energy to further increase the number of the reflection and the refraction of the optical energy, thereby fully reinforcing the optical energy on the sides of the lens body 10, so that the optical energy can form a relatively uniform spatial distribution after the secondary light distribution by the lens body 10 and the light distribution film 20, which avoids the regional distribution of local over-brightness and local over-darkness.

Of course, in other embodiments, two adjacent bubble layers are seamlessly connected, or the two adjacent bubble layers may also be partially overlapped.

Further, with reference to FIG. 3 and FIG. 4, in an embodiment of the optical component 100 of the present application, the bubble structures 21 in two adjacent bubble layers are staggered.

In this way, after entering the light distribution film 20, enough optical energy can be reflected and refracted for multiple times, which can control the strong and concentrated forward optical energy of the light source 30 in a targeted and precise manner, and distribute the light reasonably, practically and effectively.

Further, with reference to FIG. 1 and FIG. 3, in an embodiment of the optical component 100 of the present application, the thickness of the light distribution film 20 gradually decreases along the direction from the center of the light distribution film 20 to the edge. In this way, combined with the brightness distribution of the front bright spot or the light and dark aperture area of the lens body 10, the thickness distribution of the light distribution film 20 is designed based on the brightness distribution test curve, so that the light distribution film 20 is formed with a corresponding light-emitting curved surface, and the number of bubble structures 21 in the light distribution module can be controlled by controlling the thickness value of the light distribution film 20, and the light transmittance and the light-emitting intensity of each part of the light distribution film 20 can be controlled, which can control the strong and concentrated forward optical energy of the light source 30 in a targeted and precise manner, and distribute the light reasonably, practically and effectively.

It should be noted that the refraction rate of the light distribution film 20 is defined as n1, the refraction rate of the air is defined as n2, then the reflection rate of the optical energy at the critical surface of light distribution film 20 and bubble structure 21 is: $r=(n_1-n_2)^2/(n_1+n_2)^2$. The number of bubble structures 21 through which optical energy passes is defined as N, then the total reflection rate of the bubble structure 21 to the incident optical energy is: $R=1-(1-r)^N$. It can be seen that the total reflection rate of light distribution film 20 for the optical energy depends on the medium refraction rate and the number of the bubble structure 21 in the medium. When the material is determined, the number of the bubble structure 21 in the medium becomes the sole influencing variable, that is, the more the bubble structure 21, the greater the total reflection rate of the bubble structure 21 on the incident optical energy. Therefore, since the center position of the light source 30 is opposite to the center position of the light distribution film 20, and the optical energy emitted from the center position of the light source 30 is relatively large, thus the thickness of the center position of the light distribution film 20 is larger, that is, more bubble structures 21 can be formed at the center of the light distribution film 20, so that the optical energy passing through the center of the light distribution film 20 can be reflected and refracted more, so as to prevent the front optical energy from being strong and concentrated.

Further, with reference to FIG. 1 and FIG. 3, in an embodiment of the optical component 100 of the present application, the cross-sectional shape of the light distribution film 20 is one of circular, rectangular, and polygonal.

In this way, the light distribution film 20 of different shapes can be configured according to the shape of the light source 30, and the light distribution film 20 of different cross-sectional shapes can be selected, so that after the optical energy emitted by the light source 30 enters the lens body 10, most of the optical energy is emitted into the light distribution film 20 and is effectively distributed through the light distribution film 20.

Further, with reference to FIG. 1 and FIG. 3, in an embodiment of the optical component 100 of the present application, the orthographic projection of the light distribution film 20 on the preset projection plane covers the orthographic projection of the light source 30 on the preset projection plane, and the preset projection plane is the plane where the bottom of the lens body 10 is provided.

In this way, the orthographic projection of the light distribution film 20 on the preset projection plane covers the orthographic projection of the light source 30 on the preset projection plane, then after the optical energy emitted by the light source 30 enters the lens body 10, there is enough optical energy injected into the light distribution film 20 and effectively distributed through the light distribution film 20.

Figure 2:
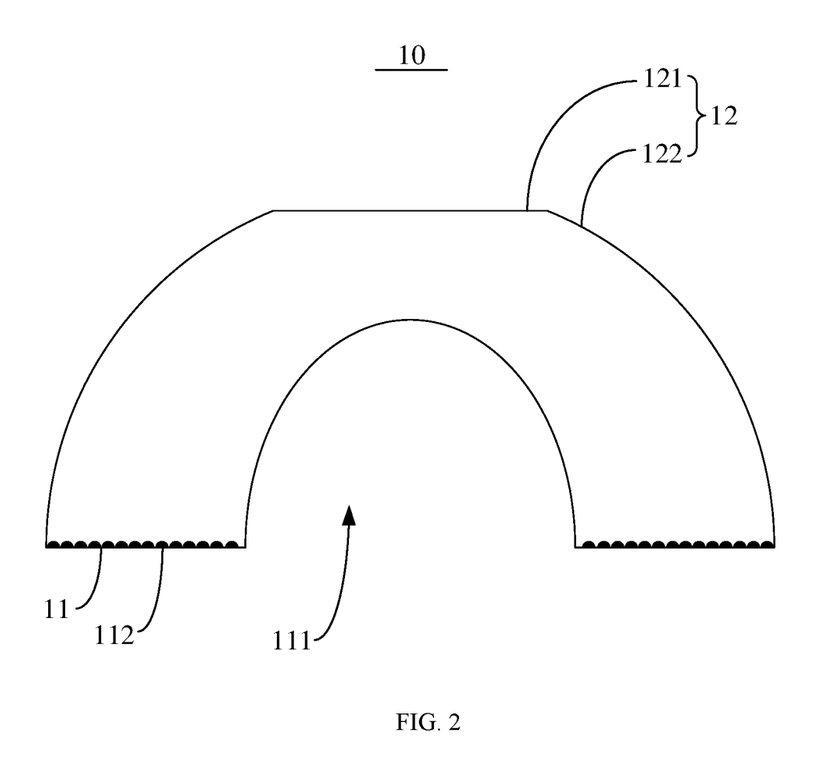
FIG. 2 is a schematic structural view of a lens body in the optical component according to an embodiment of the present application.

Referring to FIG. 1 and FIG. 2, in an embodiment of the optical component 100 of the present application, the top of the lens body 10 is provided with an arc portion 122 and a plain portion 121 connected to the arc portion 122, and the light distribution film 20 is provided on the plain portion 121.

In this way, the light distribution film 20 is provided on the plain portion 121, which is on the top of the lens body 10, when assembling the light distribution film 20, the light distribution film 20 can be smoothly fixed on the lens body 10 to ensure the strength of the connection between the light distribution film 20 and lens body 10.

Further, with reference to FIG. 1 and FIG. 2, in an embodiment of the optical component 100 of the present application, the plain portion 121 is provided in the middle of the lens body 10 and is opposite to the light source 30, and the arc portion 122 is provided around the plain portion 121.

In this way, since the plain portion 121 is opposite to the luminous surface of the light source 30, that is, the optical energy passing through the plain portion 121 is larger, and the light distribution film 20 is provided on the plain portion 121, so that part of the optical energy passing through the plain portion 121 can pass through the light distribution film 20 to form the effective light emission at the top of the lens body 10, and the part of the optical energy passing through the plain portion 121 is reflected back into the lens body 10. After multiple refractions inside the lens body 10, the optical energy is emitted from the arc portion 122 (the surrounding sides of the lens body 10) to form the effective light emitting from the surrounding sides of the lens body 10.

Specifically, both the plain portion 121 and the arc portion 122 are smooth surfaces. In this way, when the optical energy is emitted from the plain portion 121 or the arc portion 122, the loss of optical energy can be reduced to ensure the utilization of the optical energy.

Referring to FIG. 1 and FIG. 2, in an embodiment of the optical component 100 of the present application, a number of dots 112 protrude from the bottom of the lens body 10, and two adjacent dots 112 are arranged at intervals. In this way, when the optical energy is reflected and refracted under the action of the light distribution film 20 and the bubble structure 21 to be injected back to the lens body 10, part of the optical energy will be reflected and refracted to the light-incident surface 11. At this time, this part of the optical energy can be reflected under the action of dot 112 to disperse the optical energy reaching the light-incident surface 11, so that the optical energy is emitted from the light-emitting surface 12, thereby making full use of the optical energy to reduce the loss of the optical energy.

Moreover, in order to make the optical energy passing through dot 112 be reflected uniformly, the dot 112 is configured as a hemispherical convex dot, and a reflection surface of the dot 112 is an arc surface.

Of course, in other embodiments, two adjacent dots 112 are seamlessly connected, or the two adjacent dots 112 may also be partially overlapped.

In an embodiment of the optical component 100 of the present application, an optical adhesive layer (not shown) is provided between the light distribution film 20 and the light-emitting surface 12. The light distribution film 20 is fixed and pasted on the light-emitting surface 12 of the lens body 10 by the optical adhesive layer to ensure the stability of the connection between the light distribution film 20 and the lens body 10, and the optical adhesive layer does not affect the transmission of the optical energy, and the loss of the optical energy is also small. Of course, in other embodiments, other auxiliary structures may also be used to fix the light distribution film 20 on the light-emitting surface 12 of the lens body 10, such as screws, solders, etc.

Figure 5:
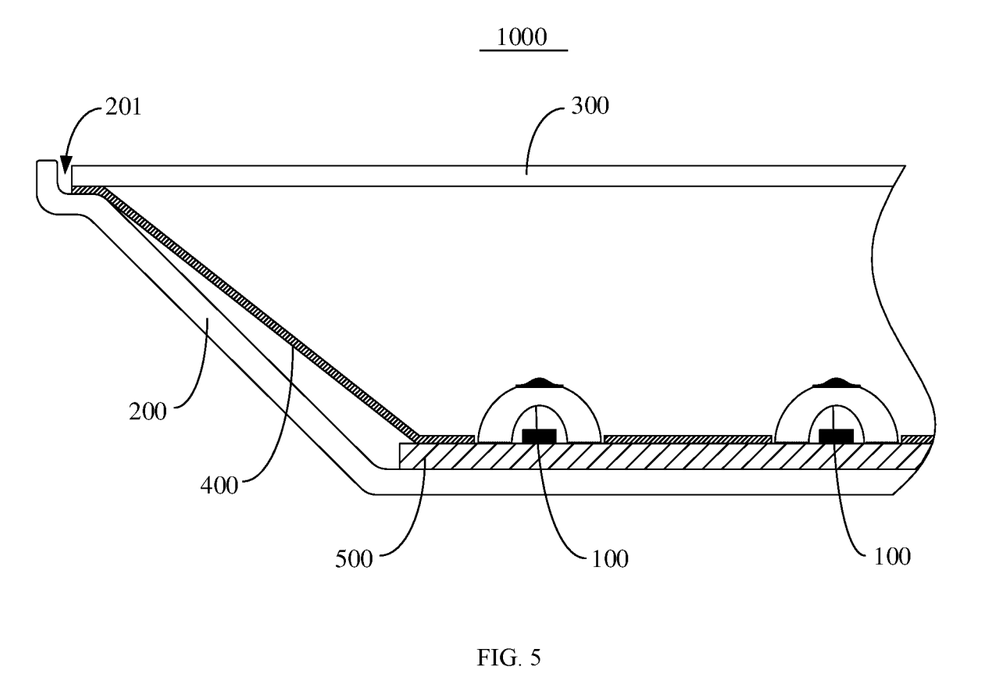
FIG. 5 is a schematic structural view of a backlight module according to an embodiment of the present application.

Referring to FIG. 5, the present application also provides a backlight module 1000, including a back plate 200 and the optical component 100. The specific structure of the optical component 100 is detailed in the previous embodiment. Since the backlight module 1000 adopts all the technical solutions of the aforementioned embodiments, it has at least all the beneficial effects brought by all the technical solutions of all the aforementioned embodiments, which will not be described again. The back plate 200 is provided with an installation groove 201, and the optical component 100 is provided in the installation groove 201.

It can be understood that when the optical component 100 of the present application is applied in the backlight module 1000, the light distribution film 20 is attached to the light-emitting surface 12 of the lens body 10, at least one bubble layer is formed in the light distribution film 20, and the bubble layer is provided with the bubble structure 21. After the optical energy emitted by the light source 30 reaches the light-emitting surface 12 of the lens body 10, part of the optical energy will avoid the bubble structure 21 and pass through the light distribution film 20 to form the effective light emission at the top of the lens body 10, and part of the optical energy entering the light distribution film 20 will be reflected and refracted on the critical surface of the bubble structure 21 and the light distribution film 20 to be reflected and refracted back to the lens body 10. After multiple refractions inside the lens body 10, this part of the optical energy is then emitted from the surrounding sides of the lens body 10 to form the effective light emission from the surrounding sides of the lens body 10. In this way, the strong and concentrated forward optical energy of the light source 30 is targetedly and accurately controlled to return part of the optical energy to the lens body 10, thereby reinforcing the optical energy on the sides of the lens body 10, so as to alleviate the situation where the optical energy emitted by the light source 30 is still strong and concentrated on the front, and weak and dispersed on the side, which alleviates the problems such as the light spot on the lamp or light and dark aperture, the filament between lamp strips and the dark frame and dark corner of the module after being projected onto the diffuser plate 300.

In this embodiment, the backlight module 1000 also includes a diffuser plate 300, a reflective sheet 400 and a circuit board 500. The circuit board 500 is attached to a bottom of the installation groove 201 in the back plate 200, the optical component 100 is provided on one side of the circuit board 500 facing away from the bottom of the installation groove 201 and is electrically connected to the circuit board 500, and a plurality of the optical components 100 are provided. The reflective sheet 400 is also provided on the side of the circuit board 500 facing away from the bottom of the installation groove 201, and is opened with a plurality of escape openings. Each of the optical components 100 is provided in one escape opening. The diffuser plate 300 is provided on one side of the optical component 100 facing away from the circuit board 500, and the diffuser plate 300 is close to a notch of the accommodating groove 201.

With reference to FIG. 3, the present application also provides a display apparatus, including the backlight module 1000. The specific structure of the backlight module 1000 can be found in the aforementioned embodiments. Since this display apparatus adopts all the technical solutions of the aforementioned embodiments, it has at least all the beneficial effects brought by all the technical solutions of all the aforementioned embodiments, which will not be described again here.

In this embodiment, the display apparatus further includes a display panel, and the display panel is provided on one side of the diffuser plate 300 facing away from the optical component 100.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. An optical component, comprising:
    a lens body, wherein a light-emitting surface is provided at a top of the lens body, and an accommodating groove is provided at a bottom of the lens body;
    a light distribution film provided on the light-emitting surface, wherein at least one bubble layer is formed in the light distribution film; and
    a light source provided in the accommodating groove, wherein a luminous surface of the light source is configured to face towards a wall of the accommodating groove;
    wherein each bubble layer is provided with a plurality of bubble structures, and two adjacent bubble structures are provided at intervals;
    the plurality of the bubble structures in each bubble layer are distributed in an array; and
    the bubble structures in two adjacent bubble layers are staggered.

2. The optical component according to claim 1, wherein two adjacent bubble layers are provided at intervals from each other in a direction from the bottom of the lens body to the top of the lens body.

3. The optical component according to claim 1, wherein a light-incident surface of the lens body is formed by the bottom of the lens body and the wall of the accommodating groove.

4. The optical component according to claim 1, wherein the lens body is made of at least one of a polymethyl methacrylate and a polystyrene, and the light distribution film is made of at least a polyethylene terephthalate.

5. The optical component according to claim 1, wherein the wall of the accommodating groove is an arc-shaped wall, and the arc-shaped wall of the accommodating groove is a smooth wall.

6. The optical component according to claim 1, wherein two adjacent bubble structures are seamlessly connected.

7. The optical component according to claim 1, wherein a thickness of the light distribution film is configured to gradually decrease in a direction from a center of the light distribution film to an edge of the light distribution film.

8. The optical component according to claim 1, wherein an orthographic projection of the light distribution film on a preset projection plane is configured to cover an orthographic projection of the light source on the preset projection plane, and the preset projection plane is a plane where the bottom of the lens body is located.

9. The optical component according to claim 1, wherein the top of the lens body is provided with an arc portion and a plain portion connected to the arc portion, and the light distribution film is provided on the plain portion.

10. The optical component according to claim 9, wherein the plain portion is provided at a central position of the lens body and is provided opposite to the light source, and the arc portion is provided around the plain portion.

11. The optical component according to claim 9, wherein both the plain portion and the arc portion are smooth surfaces.

12. The optical component according to claim 1, wherein a plurality of dots are protrudingly provided at the bottom of the lens body, and two adjacent dots are provided at intervals.

13. A backlight module, comprising:
    a back plate provided with an installation groove; and
    the optical component according to claim 1, wherein the optical component is provided in the installation groove.

14. A display apparatus, comprising the backlight module according to claim 13.

15. An optical component, comprising:
    a lens body, wherein a light-emitting surface is provided at a top of the lens body, and an accommodating groove is provided at a bottom of the lens body;
    a light distribution film provided on the light-emitting surface, wherein at least one bubble layer is formed in the light distribution film; and
    a light source provided in the accommodating groove, wherein a luminous surface of the light source is configured to face towards a wall of the accommodating groove;
    wherein a thickness of the light distribution film is configured to gradually decrease in a direction from a center of the light distribution film to an edge of the light distribution film, and the light-emitting surface of the light distribution film is a light-emitting curved surface;
    each bubble layer is provided with a plurality of bubble structures, and two adjacent bubble structures are provided at intervals;
    the plurality of the bubble structures in each bubble layer are distributed in an array; and
    the bubble structures in two adjacent bubble layers are staggered.

* * * * *